July 28, 1942.   J. J. WHARAM   2,290,927
STEERING COLUMN GEARSHIFTING DEVICE
Filed June 29, 1940   2 Sheets-Sheet 1

INVENTOR
John J. Wharam
BY Edwin C. McRae
E. L. Davie
ATTORNEYS.

July 28, 1942.　　　J. J. WHARAM　　　2,290,927
STEERING COLUMN GEARSHIFTING DEVICE
Filed June 29, 1940　　　2 Sheets-Sheet 2

INVENTOR
John J. Wharam
BY Edwin C. McRae
E. L. Davis
ATTORNEYS.

Patented July 28, 1942

2,290,927

UNITED STATES PATENT OFFICE 2,290,927

STEERING COLUMN GEAR-SHIFTING DEVICE

John J. Wharam, Dearborn, Mich., assignor to Ford Motor Company, Dearborn, Mich., a corporation of Delaware Application June 29, 1940, Serial No. 343,132

6 Claims. (Cl. 74—484)

The object of my invention is to provide a gearshifting device especially adapted for use in connection with vehicles in which the motor is mounted more or less flexibly within the vehicle frame. Steering column gearshifts have recently been widely used in such vehicles but vibration of the shifting lever, due to motor vibration, has been an objectionable feature. This type of gearshift ordinarily comprises a selecting lever mounted upon the steering column just beneath the steering wheel, which lever selectively reciprocates and oscillates a shaft which extends downwardly along the steering column to a position adjacent to the lower end of the column. A pair of arms are mounted on the lower end of this shaft, which arms are connected by links to shifting arms on the transmission. A suitable clutch is provided on the shifter shaft so that the arms may be selectively oscillated by the aforementioned shaft.

The principal disadvantage of this construction is that the transmission is positively connected to the gearshift arm so that movement of the engine and transmission unit in the vehicle frame transmits vibration through these arms to the lever beneath the steering wheel. If excessive play is provided or the clutch is made sufficiently loose so that the vibration of the motor unit will not be conducted to the shifting lever, then rattles are invariably set up in the shifter parts which are, of course, objectionable.

The object of this invention is, therefore, to prevent motor vibration from being transmitted to the shifting lever and still provide a rigid enough mounting for the lever so that rattling between the parts will be avoided.

With these and other objects in view, my invention consists in the arrangement, construction and combination of the various parts of my improved device, as described in this specification, claimed in my claims and illustrated in the accompanying drawings, in which:

Figure 1:
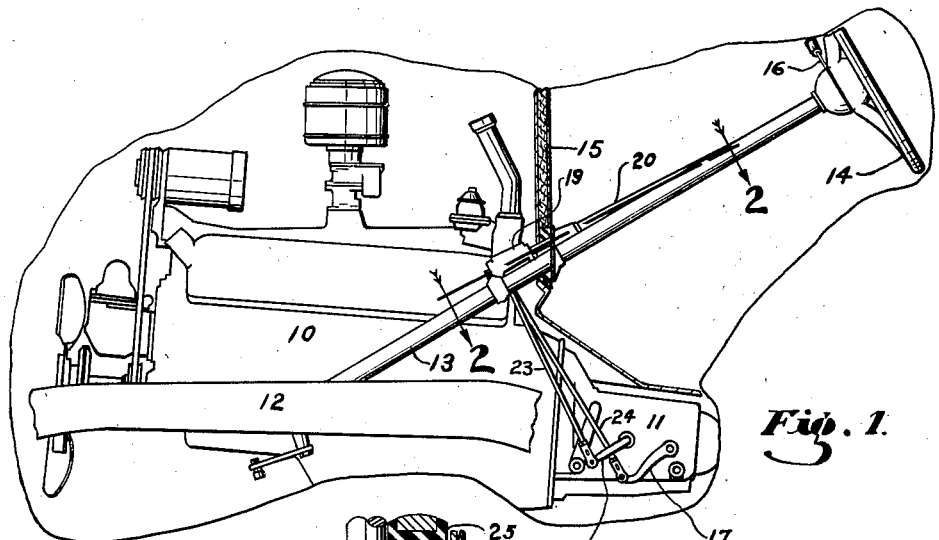
Figure 1 is a side elevation of the front portion of a motor vehicle, the vehicle body and a portion of the frame being removed to better illustrate the transmission controlling device.
Figure 2:
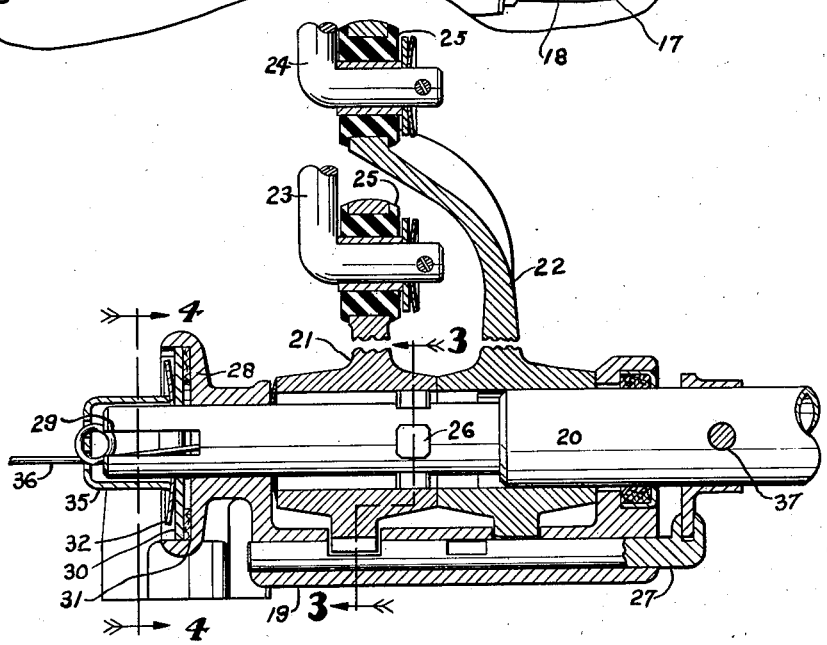
Figure 2 is a full sized sectional view, taken upon the line 2—2 of Figure 1.

Referring to the accompanying drawings, I have used the reference numeral 10 to indicate a conventional automobile engine having a sliding gear transmission 11 fixed thereto in the conventional manner. The engine 10 is flexibly mounted within a frame 12 and a steering column 13 is provided, the lowermost end of which is fixed to the frame 12 so that the column extends upwardly and forwardly in the conventional manner where a steering wheel 14 is fixed to the upper end thereof. The intermediate portion of the steering column 13 is supported by the vehicle dash 15.

The transmission 11 is provided with a low and reverse speed affecting the arm 17 and a second and direct speed affecting the arm 18, which arms extend outwardly from the steering column side of the transmission and are each adapted to be oscillated in each direction from a neutral position to effect the two speeds associated with each arm.

A bracket 19 is clamped to the steering column 13 just beneath the dash 15, which bracket is U-shaped and is provided with a pair of spaced bearings therein. A shaft 20 extends from the bracket 19 upwardly along the column 13 to a lever 16. The lower end of this shaft is rotatably and reciprocally mounted within the aforementioned bearings and the upper end is connected to the lever 16 so as to be both oscillated and reciprocated thereby. The lever 16 is pivotally mounted upon the upper end of the column 13 and extends radially to position beneath the rim of the steering wheel 14.

The mechanism for reciprocating and oscillating the shaft 20 forms no part of this invention and therefore has not been shown in detail. However, it may be well to mention that when the lever 16 is drawn toward the steering wheel, the shaft 20 will be pulled upwardly along the column 13 from a neutral position. Oscillation of the shaft in this upward position engages the low and reverse speeds in the transmission. When the shaft is in its lowermost position oscillation thereof effects the second and direct drives of the transmission. These are effected through linkage which will now be described.

Figure 3:
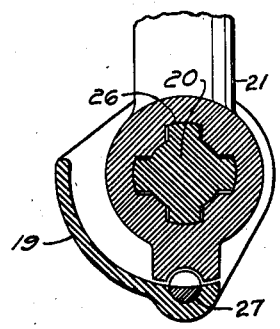
Figure 3 is a sectional view, taken upon the line 3—3 of Figure 2.
Figure 6:
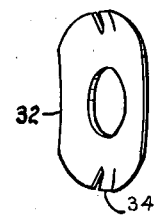
Figure 6 is a perspective view of the brake pressure spring used in this device.
Figure 4:
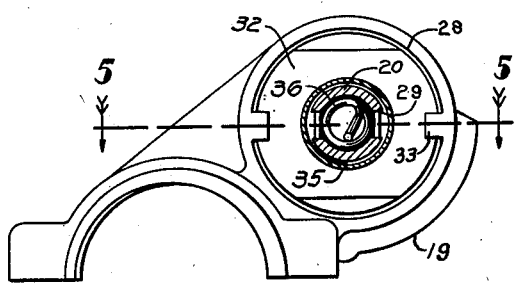
Figure 4 is a sectional view, taken upon the line 4—4 of Figure 2.
Figure 5:
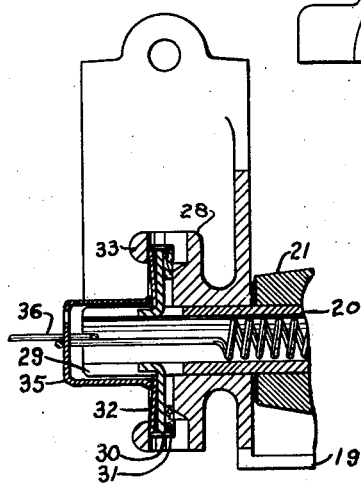
Figure 5 is a sectional view, taken upon the line 5—5 of Figure 4.

A pair of arms 21 and 22 are rotatably mounted upon the shaft 20 between the spaced bearings, the shaft receiving openings in each of these arms being provided with four splines, as shown in Figure 3. A link 23 connects the arms 21 and 18 and a second link 24 connects the arms 22 and 17. Rubber bushings 25 are interposed between the ends of each of the arms 21 and 22 and their connecting links so noise producing vibrations will not be transmitted from the transmission through the links to the arms 21 and 22.

The lower portion of the shaft 20 is provided with a 4-toothed jaw clutch 26 which, when the shaft 20 is in its lowermost position, engages the splined bore of the arm 21. When the shaft 20 is raised upwardly, the clutch engages the splined bore of the arm 22. Whichever arm is engaged by the clutch 26 will, of course, be rotated with the shaft 20 to engage or release the particular transmission gear associated therewith. A suitable interlocking pin 27 is reciprocated with the shaft 20 and coacts with interlocking ears on each of the arms 21 and 22 so that when the clutch 26 engages the arm 21, then the arm 22 will be held from rotation by the pin 27, and inversely, when the clutch 26 engages the arm 22, then the arm 21 will be held from rotation by this pin.

The foregoing structure is not the subject of this application but has been described to more clearly bring out the function of the improvements which will now be described.

It will be noted from Figure 3 that the grooves which form the splined openings through each of the arms 21 and 22 are considerably wider than the teeth of the clutch 26. The diameter of the clutch is only slightly smaller than the diameter of the splines so that the arms 21 and 22 will remain concentric upon the shaft. Due to the clearance between the sides of the clutch teeth and the sides of the splines, considerable oscillating play is permitted between these arms and the shaft 20 even when the clutch is engaged. When the motor vibrates under normal operating conditions, the links 23 and 24 will be vibrated axially and this force will cause the arms 21 and 22 to vibrate in small arcs around the shaft 20. The play between the clutch teeth and the splined openings in these arms is sufficient to permit such vibratory oscillation without transferring the vibration to the shaft. The shaft 20 is thus free for a limited movement relative to these arms.

In order to prevent such movement, which would undoubtedly cause rattles in the shifting mechanism, I have provided an annular brake plate 28 which is formed integrally with the bracket 19 adjacent to the lower end of the shaft 20. The adjacent end portion of the shaft 20 is formed as a tube, having a diametrical slot 29 machined therethrough. A brake disc 30 is mounted upon the adjacent portion of the shaft 20, this disc having two detents therein which extend into the slot 29 so that the disc 30 must rotate with the shaft 20. A ring of frictional material 31 is interposed between the disc 30 and the plate 28 and a spring washer 32 resiliently urges the disc 30 against the ring 31 to thereby hold the shaft 20 free from oscillation.

The spring washer 32 is assembled in place upon the bracket 19 in what is believed to be a novel manner. To accomplish this, a pair of inwardly extending ears 33 are formed on the periphery of the brake plate 28. The opposite sides of the spring washer 32 are flattened so that the washer may be moved down over the adjacent portion of the shaft 20 with the two flat edges aligned with the ears 33. The periphery of the washer 32 between the flatted sides is provided with diametrically opposed notches 34 into which the ears 33 are adapted to enter. After the washer 32 has been assembled upon the shaft 20, it is then rotated 90° until the ears 33 snap into the notches 34, at which time the friction brake plate 28 is under considerable compression. The washer 32 will not rotate from this position due to the notches. The washer 32, together with the disc 30 and the friction ring 31, is relied upon to act as a brake which prevents free oscillation of the shaft 20 in the bracket 19. The washer spring 32 is dished to provide this braking effect.

I have, however, provided a cap member 35 which encloses the lower end of the shaft 20 and forms an anchor for a tension spring 36 which extends upwardly through the bore in the shaft 20 and is anchored upon a transversely extending pin 37. The cap 35 acts as an anchor for the lower end of the spring 36. The function of the spring 36 is to resiliently urge the shaft 20 to its lowermost position where it is engaged with the arm 21.

The device so far described functions in the following manner:

The shaft 20 is moved by the lever 16 to engage either the arm 21 or arm 22, as desired, and then the initial portion of the rotating movement of the shaft takes up the play between the clutch teeth 26 and the splined grooves. Further rotation of the shaft moves the arm which is engaged thereby. After the transmission has been shifted, the engine is, of course, accelerated and this causes a certain vibration in the transmission, due to torque recoil of the engine. The instant the engine starts to vibrate, the vibratory movement is transmitted through the links 23 and 24, to thereby slightly rotate the shaft 20 to a position in which the vibrating arms will not transfer vibration to the shaft. At this time the friction brake plate 28 prevents the shaft 20 from freely rotating so that it is frictionally held in a neutral position and remains fixed in this position upon the steering column while the two arms 21 and 22 oscillate through very small arches in synchronism with the vibration of the motor.

The advantage of this construction is that the motor may be mounted for free movement within the frame and still a corresponding movement of the transmission will not cause vibration in the steering column or gearshifting levers.

Some changes may be made in the arrangement, construction and combination of the various parts of my improved device without departing from the spirit of my invention and it is my intention to cover by my claims such changes as may reasonably be included within the scope thereof.

I claim as my invention:

1. A gearshifting mechanism for motor vehicles having an engine and transmission resiliently mounted therein, which transmission vibrates under normal conditions independently of said vehicle comprising, a gearshifting arm fixed upon said transmission, a shaft nonresiliently mounted upon said vehicle, means connecting said shaft with said arm, a lever arranged to manually oscillate said shaft, said means permitting an amount of play between said shaft and said transmission in the direction of said transmission vibration greater than the amplitude of said vibration, and a brake disposed between said shaft and said vehicle which holds said shaft against free vibration.

2. A gearshifting mechanism for motor vehicles having an engine and transmission unit resiliently mounted therein, which transmission vibrates under normal conditions independently of said vehicle comprising, a transmission arm mounted upon said transmission, the movement of which engages one of the gear ratios in said transmission, a steering column in said vehicle, a shaft nonresiliently mounted upon said column for reciprocation and rotation relative thereto, a shifting arm rotatably mounted upon said shaft, linkage connecting the outer ends of said shifting arm and said transmission arm, and an operable clutch between said shifting arm and said shaft which permits a substantial oscillatory play between said shaft and said shifting arm, and a brake disposed between said shaft and said steering column which holds said shaft against free vibration.

3. A gearshifting mechanism for motor vehicles having an engine and transmission unit resiliently mounted therein, which transmission vibrates under normal conditions independently of said vehicle comprising, a steering column fixedly secured in said vehicle, a pair of arms mounted upon said column, linkage connecting said arms with said transmission so that movement of each of said shifting arms in each direction from a neutral position engages one of the several speed ratios of said transmission, a shaft rotatably mounted upon said column in axial alignment with said arms, clutch means formed at the lower end of said shaft which, upon reciprocation of the shaft, selectively engages said arms and, upon rotation of said shaft, rotates the engaged arm therewith, said clutch permitting substantial play between said shaft and the engaged arm, means associated with the upper end of said steering column for reciprocating and rotating said shaft, and a brake disposed between said shaft and said steering column which holds said shaft against free vibration, said brake being of such intensity that it is readily overcome by the manual actuation of said reciprocating and rotating means.

4. A gearshifting mechanism for motor vehicles having an engine and transmission unit resiliently mounted therein, which transmission vibrates under normal conditions independently of said vehicle comprising, a steering column fixed to said vehicle, a shaft rotatably and reciprocally mounted upon said steering column, a transmission arm fixed on said transmission, oscillation of which selectively engages two of the gear ratios in said transmission, a shifting arm rotatably mounted upon the lower end of said shaft, a link connecting the outer end of said transmission arm with the outer ends of shifting arm, and a clutch formed on the lower end of said shaft which operatively clutches said shaft to said arm, so that upon rotation of said shaft the engaged arm is rotated therewith, said clutch permitting a substantial oscillatory relative movement between said shaft and arm, and a brake disposed between said shaft and said steering column which holds said shaft against free vibration.

5. A gearshifting mechanism for motor vehicles having an engine and transmission resiliently mounted therein, which transmission vibrates under normal conditions independently of said vehicle comprising, a pair of transmission arms rotatably mounted upon said transmission for movement in each direction from a neutral position, each position of each arm engaging one of the speed ratios of said transmission, a steering column associated with said vehicle, a bracket fixed to the intermediate portion of said steering column, a shaft rotatably and reciprocally mounted in said bracket, said shaft extending along said steering column, a lever mounted upon the upper end of said steering column, said lever being connected to said shaft to manually oscillate and reciprocate same, a pair of shifting arms rotatably mounted upon said shaft adjacent to said bracket, links connecting the outer ends of said shifting arms with the outer ends of said transmission arms, a jaw clutch disposed on said shaft which, upon reciprocation of said shaft, selectively clutches said shifting arms to said shaft for rotation therewith, said clutch permitting a limited oscillatory relative movement between said arms and shaft, and a brake disposed between said shaft and steering column, for the purpose described.

6. A gearshifting mechanism for motor vehicles having an engine and transmission resiliently supported therein and normally vibrating independently of the vehicle, a gearshifting operating means fixed upon said transmission, a shaft non-resiliently mounted upon said vehicle, means connecting said shaft and said first-named means, said connecting means permitting an amount of play between said shaft and said first-named means in the direction of said transmission vibration greater than the amplitude of said vibration, and a brake disposed between said shaft and said vehicle restraining said shaft from free vibration.

JOHN J. WHARAM.